United States Patent [19]

Fishbein et al.

[11] 4,217,585
[45] Aug. 12, 1980

[54] DUAL FREQUENCY DOPPLER RADAR

[75] Inventors: William Fishbein, Elberon; Otto E. Rittenbach, Neptune, both of N.J.

[73] Assignee: The United States of America as represented by the Secretary of the Army, Washington, D.C.

[21] Appl. No.: 959,388

[22] Filed: Nov. 9, 1978

[51] Int. Cl.$^2$ ............................................. G01S 9/42
[52] U.S. Cl. .................................. 343/7.7; 343/5 HM; 343/5 NQ
[58] Field of Search ................. 343/5 HM, 5 NQ, 7.7

[56] References Cited

U.S. PATENT DOCUMENTS

| | | | |
|---|---|---|---|
| 2,931,030 | 3/1960 | Rey | 343/5 HM |
| 3,603,992 | 9/1971 | Goggins, Jr. et al. | 343/5 HM X |
| 3,614,786 | 10/1971 | Goggins, Jr. | 343/5 HM X |
| 3,719,946 | 3/1973 | Sletten et al. | 343/5 SA |
| 3,725,917 | 4/1973 | Sletten et al. | 343/5 SA |
| 3,733,603 | 5/1973 | Johnston | 343/7.7 X |
| 3,882,495 | 5/1975 | Bolger | 343/7.7 X |

*Primary Examiner*—Malcolm F. Hubler
*Attorney, Agent, or Firm*—Nathan Edelberg; Sheldon Kanars; Daniel D. Sharp

[57] ABSTRACT

A dual frequency moving target radar system having a lower frequency channel which provides relatively good moving target detection in the presence of such obstacles as foliage and precipitation and a higher frequency channel which provides accurate location of targets wherein the Doppler signals from the two channels are correlated to provide suitable target identification which target and clutter are present in the same resolution cell. The Doppler frequency is processed to distinguish the moving target from other returns. Electroacoustic transducers can be used in either of said channels to aid in target identification.

21 Claims, 1 Drawing Figure

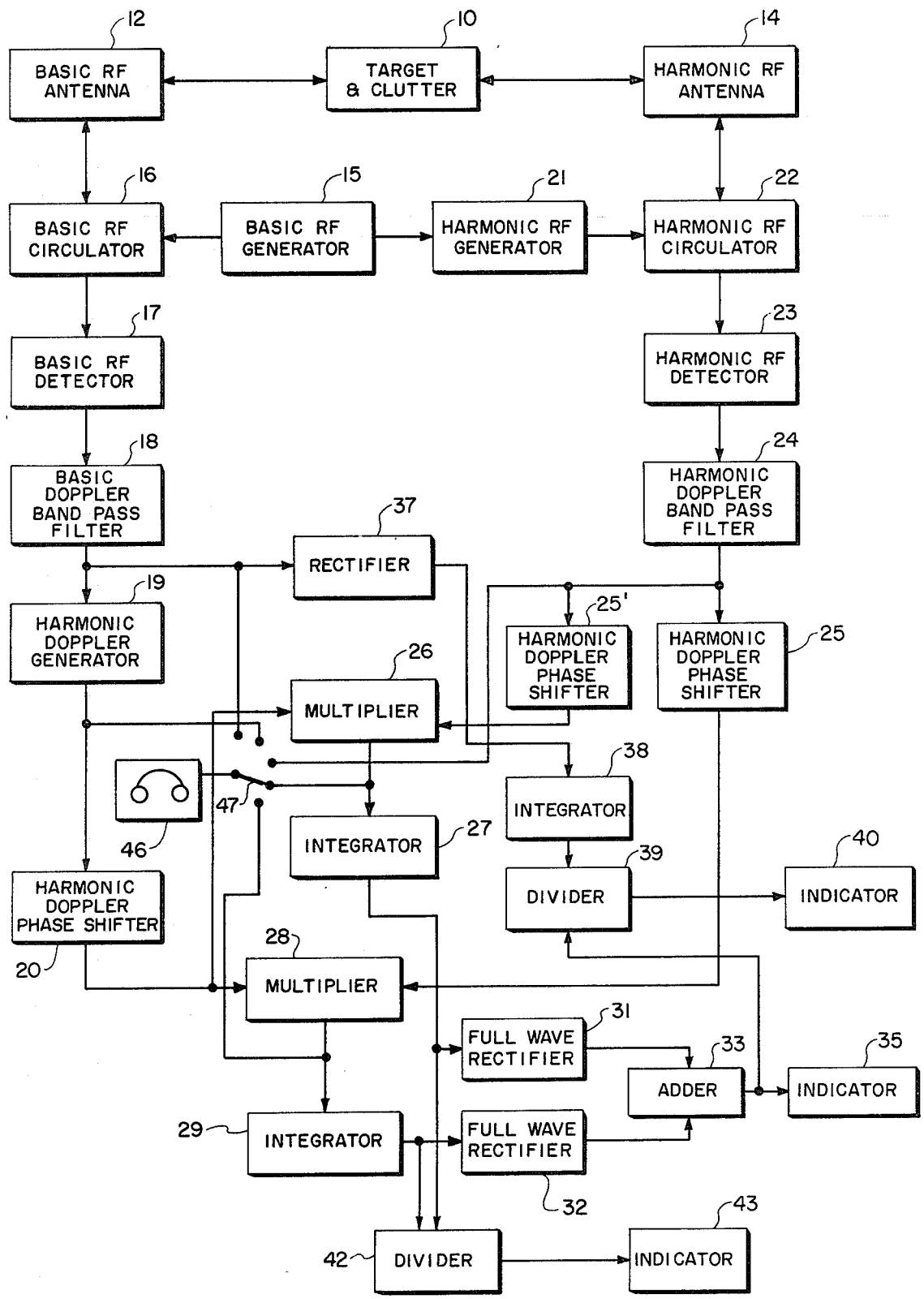

DUAL FREQUENCY DOPPLER RADAR

BACKGROUND OF THE INVENTION

The invention described herein may be manufactured and used by or for the United States government for governmental purpose without payment of any royalties thereon or therefor.

Dual channel radars have been developed which provide simultaneous range and all-range operation. Examples of such radar systems are shown in Fishbein et al U.S. Pat. No. 3,562,750 entitled "Continuous Wave Correlation Radar", issued Feb. 9, 1971 and U.S. Pat. No. 3,568,188 to Fishbein et al entitled "Continuous Wave Radar with Means for Indicating Moving Target Direction", issued Mar. 2, 1971.

In such systems, doppler frequency signals from all moving targets within a single radar beam appear in the all-range channel and doppler frequency signals from targets at a selected (gated) range appear in the range gate channel. The all-range channel signals have more energy—because of the higher duty cycle—than the range gate channel signals. By correlating doppler signals from the two channels with a single correlator, information concerning target range and direction can be obtained. By correlating the signals in the all range and range gate channels, one achieves enhancement of the return from the range gate channel. The correlation in such systems involves the multiplication of the signal of poor range resolution with a signal of good range resolution. Such systems are not designed to penetrate clutter and foliage because only one frequency signal is transmitted and this one signal must be of relatively high frequency in order to obtain a narrow beam necessary for high angular resolution.

In the present invention, targets can be detected which are normally obscured by such disturbances as foliage, atmospheric precipitation and smog because of the relatively low frequency (say, L band) operation at which disturbance penetration capability is relatively high. The low frequency doppler signal at such a low frequency is readily detectable and is useful in providing target identification. Operation at a higher frequency, however, has the advantage of providing, with a relatively small antenna aperture, a narrow beam suitable for good angular resolution and allows for an improvement in signal-to-non-signal ratio. The dual frequency system of this invention is useful when the target and clutter is in the same resolution cell (a volume of space approximately equal to the cross section of the narrower beam.

The MTI doppler radar system shown in Goggins, Jr. U.S. Pat. No. 3,614,786, issued Oct. 19, 1971, uses a harmonic frequency phase signature technique for discriminating between moving and stationary targets. Unlike the present invention, Goggins, Jr. is not designed to distinguish between a target and clutter and noise. The dual frequency signals are applied to a simple phase detector and there is no long term integration in Goggins, Jr., much less two correlators. The Goggins, Jr. system requires a relatively good signal-to-noise ratio for both channels at all times to avoid spurious indications. The system of Goggins, Jr. unlike that of the invention, would not be satisfactory for target identification in those cases when the amplitude of the higher frequency target return is equal to or less than the amplitude of the higher frequency clutter return.

The two U.S. patents to Sletten et al, namely U.S. Pat. Nos. 3,719,945 and 3,719,946, both issued Mar. 6, 1973 and the U.S. Pat. No. 3,725,917, issued Apr. 3, 1973 to Sletten et al are not doppler radar systems, these systems involve two or more multiple coherent harmonic frequency signals which are compared in phase by a phase comparator to provide one or more sets of signals whose characteristics do not distinguish a target which is moving from other returns.

The previous comments made concerning the Goggins, Jr. patent also apply to the three Sletten et al patents mentioned above.

DESCRIPTION OF THE DRAWING

The single FIGURE shows a block diagram of the dual frequency doppler radar system of the present invention.

DESCRIPTION OF A PREFERRED EMBODIMENT

The dual frequency channel doppler radar shown in the FIGURE is a continuous wave doppler radar; however, the invention is not so limited and can be used, for example, with a pulsed doppler radar. Superheterodyne receiving techniques may also be used, if desired.

Furthermore, although two antennas 12 and 14 are shown in the system of the FIGURE, it is possible to operate with a single antenna. By using separate antennas, one can take advantage of the fact that a narrow beam can be obtained at low frequencies from a given large antenna aperture.

A basic r.f. generator 15 generates energy of a basic (lower) frequency $f_1$, which energy passes through the basic frequency r.f. circulator 16 to the antenna 12. The transmitted basic frequency wave is directed into a relatively narrow region of space; in the event of interruption by a target 10, a portion of the basic frequency wave energy is collected by the basic frequency antenna 12 and is shifted in frequency from the transmitted frequency $f_1$ by an amount $\pm D$ (doppler frequency). This received signal at frequency $f_{d1}=f_1\pm D$ is routed through basic r.f. circulator 16 to a first (basic frequency) receiving channel which includes a basic r.f. detector 17 for beating $f_{d1}$ by $f_1$ and basic frequency doppler band pass filter 18 for removing all signal components except the target doppler frequency D. In other words, the basic doppler band pass filter 18 serves to remove indications from stationary targets or stationary clutter; i.e., the low frequency cutoff must be high enough to reject the dc component caused by stationary targets or clutter, yet low enough to pass the lowest doppler frequencies which one expects to encounter from targets. The high frequency cutoff will be determined by the highest likely doppler frequency. The harmonic doppler band pass filter 24, to be described later, serves the same function as the basic doppler band pass filter 18 and the design considerations are the same. A harmonic doppler generator 19 also is included in the first receiving channel for multiplying the doppler frequency by N. The basic (lower) frequency radar beam is able to penetrate atmospheric disturbances such as rain, hail, snow and elements of tree foliage or other natural moving clutter. Because of the size of this clutter, relative to the basic wavelength, the return from such clutter is substantially negligible. The frequency of the basic r.f. generator 15 is multiplied by a factor N by means of harmonic r.f. generator 21 to provide a harmonic frequency $f_2=Nf_1$. Energy from this harmonic generator 21 is transferred by way of harmonic r.f. circulator 22 to harmonic r.f. antenna 14 where it is radiated into the aforementioned region of space. Doppler radar returns at a frequency $f_{d2}=f_2\pm ND$ from both target and clutter are received by harmonic r.f. antenna 14 and coupled through harmonic r.f. circulator 22 to the second (harmonic) receiving channel which includes harmonic r.f. detector 23 for beating $f_{d2}$ by $f_2$ and harmonic doppler band pass filter 24 for removing all frequency components except ND.

The doppler signals in the two receiving channels will be used with two correlators to obtain correlator outputs in phase quadrature. This can be achieved by applying to one input of each correlator the doppler signal from the first receiving channel with identical phase shift. The other input to each of the correlators is derived from doppler signals in the second receiving channel; these doppler signals must have a phase difference of ±90 degrees, at all doppler frequencies. Each of the correlators comprises a multiplier and an integrator connected in the output thereof.

When relatively wide band operation is required (wide range of target radial velocities), it is not possible to construct a single phase shifter which will provide 90 degree phase shift over the desired band. For this reason, separate harmonic doppler phase shifters 25 and 25' must be used in the second receiving channel to provide the desired differential 90 degree phase shift in the two receiving channel outputs; in addition, a harmonic phase shifter 20 is needed in the output of the harmonic doppler generator 19 in the basic receiving channel. The phase shift introduced wide band operation in the phase shifters 20, 25' and 25 is $\phi_D$, $\phi_D$ and $\phi_D + 90$ degrees, respectively, where $\phi_D$ is a phase shift dependent upon the harmonic doppler frequency.

For such band operation, the harmonic doppler phase shifter 20 will be connected to one input of multipliers 26 and 28 and the harmonic doppler phase shifter 25' will be connected to the other input of multiplier 26 and the harmonic doppler phase shifter 25 will be connected to the other input of multiplier 28. The first multiplier 26, together with the integrator 27 connected in the output circuit thereof, forms a first correlator.

The output A of the harmonic doppler phase shifter 20 can be expressed as $$A = B_T \cos(2\pi ND_T t + \phi_B + \phi_D)$$

assuming a phase shift in the harmonic phase shifter of $\phi_D$.

Similarly, the output B of the harmonic doppler phase shifter 25' can be expressed as $$B = H_T \cos(2\pi ND_T t + \phi_H + \phi_D) + H_C \cos(2\pi ND_C t + \phi_C + \phi_D)$$

where $B_T$ is the peak amplitude of the basic target return at basic (lower) frequency $f_1$ $H_T$ is the peak amplitude of the target return at harmonic frequency $f_2 = Nf_1$ $H_C$ is the peak amplitude of the clutter return at harmonic frequency $f_2 = Nf_1$ $D_T$ is the doppler frequency for the target and $D_C$ is the effective doppler frequency for clutter, both at basic frequency $f_1$ $\phi_B$ is the target round trip phase shift of the wave of frequency $f_1$ at the time $t = 0$, multiplied by N $\phi_H$ is the target round trip phase shift of the wave of frequency $f_2$ at the time $t = 0$ and $\phi_C$ is the resultant round trip phase shift from clutter encountered by the wave of harmonic frequency $f_2$ at time $t = 0$.

The target return, at the relatively lower basic frequency $f_1$, is significant but the lower frequency beam is characterized by consideration penetration of the smaller-sized clutter so that the basic return from the clutter $B_C$ is substantially small compared with the basic return from the target, i.e., $B_C < B_T$.

At the output C of first multiplier 26 we then have $$C = B_T \cos(2\pi ND_T t + \phi_B + \phi_D)[H_T \cos(2\pi ND_T t + \phi_H + \phi_D) + H_C \cos(2\pi ND_C t + \phi_C + \phi_D)] = B_T H_T \cos(2\pi ND_T t + \phi_B + D) \cos(2\pi ND_T t + \phi_H + \phi_D) + B_T H_C \cos(2\pi ND_T t + \phi_B + \phi_D) \cos(2\pi ND_C t + \phi_C + \phi_D).$$

The product of the first two terms, as well as that of the last two terms, is of the form $\cos\alpha \cos\beta$ which can be expressed as $\frac{1}{2}\cos(\alpha+\beta) + \frac{1}{2}\cos(\alpha-\beta)$.

$$C = \tfrac{1}{2} B_T H_T [\cos(2\pi ND_T t + \phi_B + \phi_D + 2\pi ND_T t + \phi_H + \phi_D) + \cos(2\pi ND_T t + \phi_B + \phi_D - 2\pi ND_T t - \phi_H - \phi_D)] + \tfrac{1}{2} B_T H_C [\cos(2\pi ND_T t + \phi_B + \phi_D) + 2\pi ND_C t + \phi_C + \phi_D) + \cos(2\pi ND_T t + \phi_B + \phi_D - 2\pi ND_C t - \phi_C - \phi_D)] = \tfrac{1}{2} B_T H_T [\cos(4\pi ND_T t + \phi_B + \phi_H + 2\phi_D) + \cos(\phi_B - \phi_H)] + \tfrac{1}{2} B_T H_C [\cos(2\pi N(D_T + D_C)t + \phi_B + \phi_C + 2\phi_D) + \cos(2\pi N(D_T - D_C)t + \phi_B - \phi C)]$$

After integration by the first integrator 27, the cosine terms involving frequency $ND_T$ integrate substantially to zero, so that the output D of integrator 27 reduces to $$D = \tfrac{1}{2} B_T H_T \cos(\phi_B - \phi_H)$$

The second correlator includes a second multiplier 28 receptive of the outputs from the harmonic phase shifter 20 and the output of the harmonic doppler phase shifter 25. The second correlator further comprises a second integrator 29 responding to the output of the second multiplier 28.

The output E of the harmonic doppler phase shifter 25 is given by $$E = H_T \cos(2\pi ND_T t + 90° + \phi_H + \phi_D) + H_C \cos(2\pi ND_T t + 90° + \phi_C + \phi_D)$$

Here, the 90 degree phase is assumed to be leading, hence, the + sign. Note that a phase differential of ±90 degrees must exist between the outputs B and E. When combined in multiplier 28 with the output A of the phase shifter 20, the output F of the second multiplier 28 is $$F = B_T \cos(2\pi ND_T t + \phi_B + \phi_D)[H_T \cos(2\pi ND_T t + 90 + \phi_H + \phi_D) + H_C \cos(2\pi ND_C t + 90° + \phi_C + \phi_D)]$$

$$F = B_T H_T \cos(2\pi ND_T t + \phi_B + \phi_D) \cos(2\pi ND_T t + 90° + \phi_H + \phi_D) + B_T H_C \cos(2\pi ND_T t + \phi_B + \phi_D) \cos(2\pi ND_C t + 90° + \phi_C + \phi_D)$$

$$= \tfrac{1}{2} B_T H_T [\cos(4\pi ND_T t + \phi_B + \phi_H + 90° + 2\phi_D) + \cos(\phi_B - \phi_H - 90°)] + \tfrac{1}{2} B_T H_C \{\cos[2\pi N(D_T + D_C)t +$$

$$\phi_B + \phi_C + 2\phi_D + 90°] + \cos[2\pi N(D_T - D_C) + \phi_B - \phi_C - 90°]\}$$

Since the cosine terms involving frequency integrate to substantially zero, the output G of the second integrator 29 becomes $$G = \tfrac{1}{2} B_T H_T \cos(\phi_B - \phi_H - 90°)$$

Since $\cos(\alpha - 90°) = \sin \alpha$ $$G = \tfrac{1}{2} B_T H_T \sin(\phi_B - \phi_H)$$

The outputs of the integrators 27 and 28 are full wave rectified by respective rectifiers 31 and 32. If the full wave rectifiers are squarers, the output H of rectifier 31 is given by $$H = \tfrac{1}{4} B_T^2 H_T^2 \cos^2(\phi_B - \phi_H)$$

Similarly, the output I of rectifier 32 is given by $$I = \tfrac{1}{4} B_T^2 H_T^2 \sin^2(\phi_B - \phi_H)$$

The sum J is derived at the output of an algebraic adder 33 and is given by $$J = \tfrac{1}{4} B_T^2 H_T^2 [\cos^2(\phi_B - \phi_H) + \sin^2(\phi_B - \phi_H)]$$

Since $\cos^2 \alpha + \sin^2 \alpha = 1$, the sum J reduces to $$J = \tfrac{1}{4} B_T^2 H_T^2$$

The adder output is indicated by an indicator 35, which, for example, may be a current meter.

If linear full wave detectors are used instead of squarers, then $$H = \tfrac{1}{2} B_T H_T |\cos(\phi_B - \phi_H)| \text{ and } I = \tfrac{1}{2} B_T H_T |\sin(\phi_B - \phi_H)|$$

and the sum J becomes $$J = \tfrac{1}{2} B_T H_T \{|\cos(\phi_B - \phi_H)| + |\sin(\phi_B - \phi_H)|\} = (k/2) B_T H_T$$

where the absolute values of the cosine and sine terms will fall between 0 and 1. If adder 33 is an algebraic adder, the value k, that is, the sum of the absolute values of the cosine and sine terms, ranges between 1 and $\sqrt{2}$ so that the range of values for J would be approximately from 0.5 $B_T H_T$ to 0.7 $B_T H_T$. The adder 33 can be a conventional geometric adder wherein the inputs from the linear rectifiers are processed to obtain 0.5 $B_T H_T$.

In either case, it will be noted that the sum output J is not affected by clutter returns. When square wave rectifiers are used, the output depends only on the peak amplitudes of the target returns at the two radar frequencies $f_1$ and $f_2 = Nf_1$; in the case of linear rectifiers used with an algebraic adder, the output also depends upon the target round trip phase shift, but not on the clutter phase shift. If one uses a geometric adder with the linear rectifiers, the adder output is completely independent of phase shift.

The indicated amplitude level of the added output J will provide one indication of the nature of the target or targets in the aforesaid region of space. For example, an indication of the size of the target can be obtained with the sum signal output.

The output of the harmonic doppler generator 19 is given by $B_T \cos(2\pi ND_T t + \phi_B)$ and the output of the harmonic doppler band pass filter 24 is $H_T \cos(2\pi ND_T T + \phi_H) + H_C \cos(2\pi ND_C t + \phi_C)$. If earphones 46 are supplied by either of these outputs, the ear will respond to a frequency $ND_T$, as given by the following portions of the immediately preceding outputs.

$B_T \cos 2\pi ND_T t$ and $H_T \cos 2\pi ND_T t + H_C \cos 2\pi ND_C t$, respectively, but does not respond to any of the phase angles $\phi_B$, $\phi_H$, and $\phi_C$. Such a connection is adapted for medium speed targets.

The manner of variation of the tone in the earphones will depend on the type of target so that the earphones serve as a means for target identification. For example, a plane moving with constant radial velocity would result in a monotone at the earphones, while a tone which varies downward in pitch to inaudible could represent a braking vehicle, etc. Furthermore, since no two targets have exactly the same relative motion, different tone characteristics in the earphones will readily identify the presence of more than one target in the aforesaid region of space. The earphones 46 can be positioned to respond selectively to either of the inputs of the harmonic doppler phase shifters 20 or 25 by means of switch 47.

For relatively low speed targets, that is, for lower doppler frequencies $ND_T$, it may be preferable to connect the earphones 46 to the outputs of either of the two multipliers 26 or 28. In this manner, one makes use of the second harmonic of the doppler frequency, viz. frequency $2ND_T$. This is accomplished by placing the earphones 46 in the output of either of the multipliers 26 or 28. This double frequency may be more readily audible for lower speed targets than the lower frequency doppler frequency $ND_T$ present at the inputs to multiplier 26. The switch 47 may be used to select one or the other of the two multiplier outputs as the earphone input to satisfy redundancy requirements. The earphones, if connected to the output of the first multiplier 26, will respond to the frequency varying portion of the output C, viz., $$\tfrac{1}{2} B_T H_T [\cos(4\pi ND_T t)] + \tfrac{1}{2} B_T H_C \{\cos[2\pi N(D_T + D_C)t] + \cos[(2\pi N(D_T - D_C)t]\}$$

Note that the cosine terms $4\pi ND_T t$ is twice as high in frequency as the $2\pi ND_T t$ terms found in the equations for outputs A and B (that is, the inputs of the multiplier 26).

For high speed targets, the switch 47 is positioned so as to insert the earphones in the output of the basic doppler band pass filter 18. The doppler frequency at this point in the circuit is lower than that at the inputs to multiplier 26 by a factor N.

In addition to obtaining target identification information in the form of the product of the peak amplitude of the target returns at the two frequencies, it is also possible to obtain other target identification information, namely the ratio of the aforesaid peak amplitudes.

To obtain this information, either a fourth power law or a second power law (squarer) rectifier 37 is connected in the output of the basic doppler band filter 18 to obtain an output which is proportional to the fourth power or the second power, respectively, of the peak amplitude of the basic frequency radar return. The fourth power rectifier 37 is used in conjunction with square law full wave rectifiers 31 and 32, while the square law rectifier 37 is used when linear full wave rectifiers 31 and 32 are used. The output K of rectifier 37, if it is of the fourth power type, will be given by $$K = B_T^4 \cos^4(2\pi D_T t + \phi_B)$$

This output K is integrated by integrator 38 to obtain an output $L = \frac{3}{8} B_T^4$. A divider 39 responds to both the output of integrator 38 and the output J of adder 33 to obtain an output M which is equal to the ratio of J to L. This ratio M is given by $$M = (H_T/B_T)^2$$

This output can be supplied to conventional indicating means 40. If the rectifiers 31 and 32 are linear, and the adder is algebraic and the rectifier 37 is a square law rectifier, it can be shown that the output M of divider 39 is $(1/k)(H_T/B_T)$ where k is determined by the phase angle $(\phi_B - \phi_H)$ as defined earlier. The indicated output 40 will depend on the relative size of the target radar cross section. For example, if the target is of the order of a half wavelength or smaller at the higher ($f_2$) of the two r.f. frequencies, the lower frequency ($f_1$) return will be much smaller than the higher frequency ($f_2$) return and the ratio M will be much greater than one. On the other hand, if the target size is approximately a half wavelength, or longer, at the lower frequency $f_1$, then the ratio will average unity.

It is further possible to obtain additional information concerning target by dividing by means of divider 42 the output G from integrator 29 by the output D from integrator 27. A glance at the previous equations will clearly indicate that the output P of divider 42 is given by $$P = \frac{G}{D} = \frac{\sin(\phi_B - \phi_H)}{\cos(\phi_B - \phi_H)} = \tan(\phi_B - \phi_H)$$

This output, which can be applied to an indicator 43, provides additional information concerning the relative phase of the target returns at both frequencies which is not available at the indicators 35 and 40.

If only narrow band operation is needed (narrow range of target radial velocities), one can remove the harmonic phase shifters 20 and 25', since it is now possible to construct a 90 degree phase shifter over this relatively narrow band, thereby leaving only the phase shifter 25 connected to the output of the harmonic doppler band pass filter 24 in the second (harmonic) receiving channel. In this case, the phase shift introduced by harmonic doppler phase shifter 25 is 90 degrees. Now, the output of harmonic doppler generator 19 would be connected to one input of both multipliers 26 and 28, while the output of the harmonic doppler band pass filter 24 is connected to said other input of multiplier 26, and the output of harmonic doppler phase shifter 25 would be coupled to the other input of multiplier 28. Note that, in the case of narrow band operation, $\phi_D$ in the foregoing equations A, B, etc. is 0 degree.

If there should be no instantaneous phase difference between the two receiving channel outputs, as, for example, in the case of certain moving corner reflectors, it would be possible to dispense with one of the two correlators. In this case, one also could remove the three phase shifters 20, 25 and 25' as well as the components 31, 32, 33, 42 and 43 and connect the output of the correlator integrator 27 directly to indicator 35; the latter may be a power meter. The lower position of switch 47 would not be necessary in this special case of phase coincidence. Moreover, the integrator 27 will be connected to divider 39 in this special case.

What is claimed is:

1. A doppler radar system for determining characteristics of a target based on the peak amplitudes of the target returns of two harmonically related frequencies $f_1$ and $f_2$ comprising means for generating and radiating into a region of space occupied by a moving target and clutter a first signal of frequency $f_1$ substantially unaffected by moving clutter, means for generating and radiating into said region of sapce a second signal of frequency $f_2$ which is an integral number N times higher in frequency than said first frequency, first and second receiving channels including means for selectively receiving respective first and second doppler shifted signals of frequency $f_1 \pm D$ and $f_2 \pm ND$ after reflection of said first and second signals from a target and from clutter and for mixing said doppler shifted signals with said radiated signals to produce first and second doppler frequency signals of frequency D and ND, frequency multiplying means disposed in first receiving channel for multiplying the frequency of said first doppler frequency signal by a factor N to obtain a multiplied doppler frequency signal of frequency ND, and at least one correlator means responding to said doppler frequency signals of frequency ND in both of said receiving channels comprising a frequency multiplier and an integrator coupled to said multiplier for providing an integrated output independent of radar returns from said moving clutter.

2. A doppler radar system as recited in claim 1 wherein said receiving channels each includes a doppler band pass filter which substantially eliminates energy reflected from stationary objects.

3. A doppler radar system as recited in claim 2 further including electroacoustic transducing means selectably connected in either of said receiving channels for responding to time-varying components of the doppler frequency signals.

4. A doppler radar system as recited in claim 3 wherein said electroacoustic transducing means is selectably connected in the output of either of said band pass filters.

5. A doppler radar system as recited in claim 1 wherein said electroacoustic transducing means is connected in the output of said frequency multiplying means.

6. A doppler radar system as recited in claim 1 wherein said electroacoustic transducer means is connected in the output of said multiplier.

7. A doppler radar system as recited in claim 1 wherein said correlator means includes first and second correlators each comprising a frequency multiplier and a separate integrator coupled to said multiplier for providing a corresponding integrated output independent of radar returns from said moving clutter, each of said frequency multipliers having a first input and a second input circuit, said first input circuit of both of said correlator frequency multipliers responding to the same multiplied doppler frequency signal from said receiving channel, and phase shifting means in said second receiving channel for providing a pair of second doppler frequency signals of frequency ND in said second receiving channel which differ in phase from one another by 90 degrees, each of the second input circuits of said correlator frequency multipliers responding to a corresponding one of said pair of doppler frequency signals of frequency ND in said second receiving channel.

8. A doppler radar system as recited in claim 7 wherein said phase shifting means includes a pair of harmonic doppler phase shifters, and a harmonic doppler phase shifting device in the output of said frequency multiplying means of said first receiving channel, the first input circuit of each of said correlator frequency multipliers being responsive to the output of said harmonic doppler phase shifting device.

9. A doppler radar system as recited in claim 7 wherein said phase shifting means includes a single harmonic doppler phase shifter and the first input circuit of each of said correlator frequency multipliers are coupled to the output of said frequency multiplying means.

10. A doppler radar system as recited in claim 7 further including a pair of full wave rectifiers, each coupled to a corresponding one of said correlator integrators and means for adding the outputs of said full wave rectifiers.

11. A doppler radar system according to claim 10 further including an indicating means responsive to the output of said adding means for obtaining target identification information in the form of the product of the peak amplitudes of the target returns at the two frequencies $f_1$ and $f_2$.

12. A doppler radar system as recited in claim 11 wherein each of said full wave rectifiers have a square law characteristic.

13. A doppler radar system as recited in claim 11 wherein each of said full wave rectifiers have a linear characteristic.

14. A doppler radar system as recited in claim 7 further including means for dividing the output of the integrator of said first correlator means by the output of the integrator of said second correlator means, and an indicator responsive to the output of said means for dividing for providing information concerning the relative phase of the target returns at the two frequencies $f_1$ and $f_2$.

15. A doppler radar system as recited in claim 10 wherein said first receiving channel includes a doppler band pass filter which substantially eliminates energy reflected from stationary objects, and further including rectifying means coupled to said doppler band pass filter in said first channel, an integrating circuit coupled to said rectifier, and a divider network for dividing the output of said integrating circuit and the output of said means for adding, and indicating means in the output of said divider network for providing information concerning the ratio of the peak amplitudes of the target returns at the two frequencies $f_1$ and $f_2$.

16. A doppler radar system as recited in claim 15 wherein said rectifying means has a fourth power law characteristic and said full wave rectifiers each have a square law characteristic.

17. A doppler radar system as recited in claim 15 wherein said rectifying means has a square law characteristic and said full wave rectifiers are each linear rectifiers.

18. A doppler radar system according to claim 15 further including rectifying means coupled to said doppler band pass filter in said first channel, an integrating circuit coupled to said rectifier, a divider circuit for dividing the outputs of the integrators of said correlation means, and an indicator circuit responsive to the output of said divider circuit.

19. A doppler radar system according to claim 18 further including electroacoustic transducing means selectably connected in either of said receiving channels for responding to time-varying components of the doppler frequency signals.

20. A doppler radar system as recited in claim 18 wherein said rectifying means has a fourth power law characteristic and said full wave rectifiers each have a square law characteristic.

21. A doppler radar system as recited in claim 18 wherein said rectifying means has a square law characteristic and said full wave rectifiers are each linear rectifiers.

* * * * *